US011131296B2

(12) United States Patent
Kim

(10) Patent No.: US 11,131,296 B2
(45) Date of Patent: Sep. 28, 2021

(54) TRANSVERSE FLUX TYPE RECIPROCATING MOTOR AND RECIPROCATING COMPRESSOR HAVING A TRANSVERSE FLUX TYPE RECIPROCATING MOTOR

(71) Applicant: LG ELECTRONICS INC., Seoul (KR)

(72) Inventor: Jaebeum Kim, Seoul (KR)

(73) Assignee: LG ELECTRONICS INC.

(*) Notice: Subject to any disclaimer, the term of this patent is extended or adjusted under 35 U.S.C. 154(b) by 626 days.

(21) Appl. No.: 15/888,268

(22) Filed: Feb. 5, 2018

(65) Prior Publication Data

US 2018/0223821 A1 Aug. 9, 2018

(30) Foreign Application Priority Data

Feb. 7, 2017 (KR) .................. 10-2017-0016684

(51) Int. Cl.
*F04B 35/04* (2006.01)
*H02K 33/00* (2006.01)
(Continued)

(52) U.S. Cl.
CPC ............ *F04B 35/04* (2013.01); *F04B 35/045* (2013.01); *H02K 1/34* (2013.01); *H02K 16/00* (2013.01);
(Continued)

(58) Field of Classification Search
CPC ......... F04B 35/04; F04B 35/045; H02K 1/34; H02K 33/00; H02K 33/12; H02K 16/00
(Continued)

(56) References Cited

U.S. PATENT DOCUMENTS 2,628,319 A * 2/1953 Vang .................. H02K 33/12
310/15
4,363,980 A * 12/1982 Petersen .................. G03B 9/32
310/15
(Continued)

FOREIGN PATENT DOCUMENTS

CN 102714453 10/2012
JP 2007-318858 12/2007
(Continued)

OTHER PUBLICATIONS

Chinese Office Action dated Jan. 14, 2020.
International Search Report dated Jun. 14, 2018 issued in Application No. PCT/KR2018/001609.

*Primary Examiner* — Christopher S Bobish
(74) *Attorney, Agent, or Firm* — Ked & Associates LLP

(57) ABSTRACT

A transverse flux type reciprocating motor and a reciprocating compressor having a transverse flux type reciprocating motor are provided. The transverse flux type reciprocating motor may include a first reciprocating module including a first stator and a first rotor that reciprocates with respect to the first stator, a second reciprocating module including a second stator disposed to be spaced apart from the first stator in parallel to an axial direction and a second rotor that reciprocates with respect to the second rotor in the axial direction, and a connection member that connects side surfaces, which face each other, of the first rotor and the second rotors to each other. Thus, a magnetic resonance spring for allowing the rotor to be resonant with respect to the stator may be realized by using a force that moves to a side at which magnetic resistance is low between the stator and the rotor.

10 Claims, 14 Drawing Sheets

(51) Int. Cl.
*H02K 1/34* (2006.01)
*H02K 33/12* (2006.01)
*H02K 16/00* (2006.01)
*H02K 7/14* (2006.01)

(52) U.S. Cl.
CPC ............ *H02K 33/00* (2013.01); *H02K 33/12* (2013.01); *H02K 7/14* (2013.01)

(58) Field of Classification Search
USPC ............ 417/417, 416; 310/15, 12.01, 12.15, 310/12.24–25
See application file for complete search history.

(56) References Cited

U.S. PATENT DOCUMENTS

| | | | | |
|---|---|---|---|---|
| 4,675,563 A * | 6/1987 | Goldowsky | ............ | H02K 33/10 290/1 R |
| 5,225,726 A * | 7/1993 | Tozoni | ............ | B60L 13/04 104/282 |
| 5,315,190 A * | 5/1994 | Nasar | ............ | H02K 35/06 310/12.15 |
| 5,495,131 A * | 2/1996 | Goldie | ............ | H02K 17/16 310/112 |
| 5,654,596 A * | 8/1997 | Nasar | ............ | F02G 1/0435 310/12.15 |
| 6,087,742 A * | 7/2000 | Maestre | ............ | H02K 41/033 310/12.24 |
| 6,657,326 B1 * | 12/2003 | Yamamoto | ............ | H02K 33/16 310/12.24 |
| 6,858,954 B2 * | 2/2005 | Kwon | ............ | H02K 33/16 310/15 |
| 6,914,351 B2 * | 7/2005 | Chertok | ............ | H02K 33/16 310/12.26 |
| 7,154,198 B2 * | 12/2006 | Kawai | ............ | H02K 41/03 310/12.15 |
| 7,205,686 B2 * | 4/2007 | Okubo | ............ | H02K 41/0356 310/12.26 |
| 7,696,654 B2 * | 4/2010 | Sugita | ............ | H02K 41/03 310/12.15 |
| 7,719,144 B2 * | 5/2010 | Cardon | ............ | H02K 7/106 310/12.33 |
| 8,212,446 B2 * | 7/2012 | Takeuchi | ............ | H02K 21/24 310/156.37 |
| 8,562,312 B2 * | 10/2013 | Kang | ............ | H02K 33/12 417/417 |
| 8,714,946 B2 * | 5/2014 | Barito | ............ | F04B 39/127 417/417 |
| 8,810,082 B2 * | 8/2014 | Aoyama | ............ | H02K 41/03 310/12.22 |
| 9,787,169 B2 * | 10/2017 | Hiemstra | ............ | H02K 41/0356 |
| 10,288,117 B2 * | 5/2019 | Suzuki | ............ | H02K 11/33 |
| 2003/0219350 A1 * | 11/2003 | Meijers | ............ | F04B 35/045 417/416 |
| 2004/0251748 A1 * | 12/2004 | Inagaki | ............ | H02K 7/14 310/14 |
| 2007/0152516 A1 * | 7/2007 | Lee | ............ | H02K 33/16 310/15 |
| 2013/0221768 A1 | 8/2013 | Kawarai | | |
| 2014/0035393 A1 * | 2/2014 | Chung | ............ | H02K 1/14 310/12.15 |
| 2016/0186883 A1 * | 6/2016 | Rausch | ............ | F16K 31/0679 251/65 |

FOREIGN PATENT DOCUMENTS

| | | |
|---|---|---|
| JP | 2008-259264 | 10/2008 |
| JP | 2010-178484 | 8/2010 |
| KR | 10-0492612 | 5/2005 |
| KR | 10-0539813 | 1/2006 |

* cited by examiner

TRANSVERSE FLUX TYPE RECIPROCATING MOTOR AND RECIPROCATING COMPRESSOR HAVING A TRANSVERSE FLUX TYPE RECIPROCATING MOTOR

CROSS-REFERENCE TO RELATED APPLICATION(S)

The present application claims priority under 35 U.S.C. 119 and 35 U.S.C. 365 to Korean Patent Application No. 10-2017-0016684, filed in Korea on Feb. 7, 2017, which is hereby incorporated by reference in its entirety.

BACKGROUND

1. Field

A transverse flux type reciprocating motor and a reciprocating compressor having a transverse flux type reciprocating motor are disclosed herein.

2. Background

Motors are apparatuses that convert electric energy into mechanical energy to obtain a rotational force or reciprocating power. Such a motor may be divided into an AC motor and a DC motor according to power applied to the motor.

The motor includes a stator and a mover or rotor. The rotor provided with a magnet rotates or reciprocates according to a direction of a flux generated when current flows through a coil provided in the stator.

The motor may be divided into a rotary motor or a reciprocating motor according to a mode of motion of the rotor. In the rotary motor, a flux is generated in the stator by power applied to the coil, and the rotor rotates with respect to the stator by the flux. On the other hand, in the reciprocating motor, the rotor linearly reciprocates with respect to the stator.

In recent years, a reciprocating motor has been introduced for a compressor in which a stator has a cylindrical shape including an inner stator and an outer stator, and a coil for generating induced magnetization is wound around one of the inner stator or the outer stator. In a case of the reciprocating motor for the compressor, a magnet in which magnet poles are arranged in an axial direction of the stator is provided in the rotor to allow the rotor to reciprocate in an air gap between the inner stator and the outer stator.

The reciprocating motor for the compressor is disclosed in Korean Patent Registration No. 10-0492612 (hereinafter, referred to as "Related Art 1") and Korean Patent Registration No. 10-0539813 (hereinafter, referred to as "Related Art 2"), which are hereby incorporated by reference. In Related Arts 1 and 2, a plurality of iron cores, each of which is provided as a thin plate, is radially stacked on a magnetic coil having an annular shape to form an outer stator or an inner stator.

As described above, in a case in which the reciprocating motor according to the related art is applied to the compressor, when a load is applied to a compression chamber, the rotor is pushed toward a bottom dead center (BDC). When the rotor is driven in a backwardly pushed state as described above, the motor may not output as much as a designed value and also may deteriorate in efficiency by an insufficient cooling performance due to an insufficient stroke. Thus, to compensate the pushed degree of the rotor, a physical spring for pushing the rotor toward a top dead center (TDC) is applied.

Also, the reciprocating motor according to the related art includes a mechanical resonance spring, which is provided as a compression coil spring, on each of both sides in a reciprocating direction of the motor so that the motor stably reciprocates. Thus, when the rotor moves in a frontward and rearward direction along a flux direction of the power applied to the coil, the mechanical resonance spring disposed in a moving direction of the rotor may accumulate repulsive force while being compressed. Then, when the rotor moves in an opposite direction, the mechanical resonance spring in which the repulsive force is accumulated may push the rotor. A series of this process is repeated.

However, in the reciprocating motor according to the related art, although the rotor is supported by the mechanical resonance spring, as the compression coil spring is resonant by oneself due to its characteristics, a drive frequency in a specific section even within a drive frequency in a certain section is not used as the drive frequency.

Also, in the reciprocating motor according to the related art, as the compression coil spring supports the rotor, a mechanical stress limit and a limitation in vibration distance may occur due to characteristics of the compression coil spring. Therefore, as the resonance spring has to secure a predetermined wire diameter and a length of the spring, a decrease in transverse length of the reciprocating motor may be limited.

Also, in the reciprocating motor according to the related art, the magnet and a magnet frame supporting the magnet may increase in thickness to increase a total weight of the rotor. In addition, when the reciprocating motor according to the related art is applied to the compressor, while a piston compresses a refrigerant in the compression space of the cylinder, a pressure is applied to the piston to allow the piston to be pushed in a direction that is away from a discharge valve, that is, toward the bottom dead center (BDC). In this case, as a center of the rotor moves to a direction toward the bottom dead center (BDC), a drive stroke of the rotor and the piston is reduced.

BRIEF DESCRIPTION OF THE DRAWINGS

Embodiments will be described in detail with reference to the following drawings in which like reference numerals refer to like elements, and wherein.

DETAILED DESCRIPTION

Figure 1:
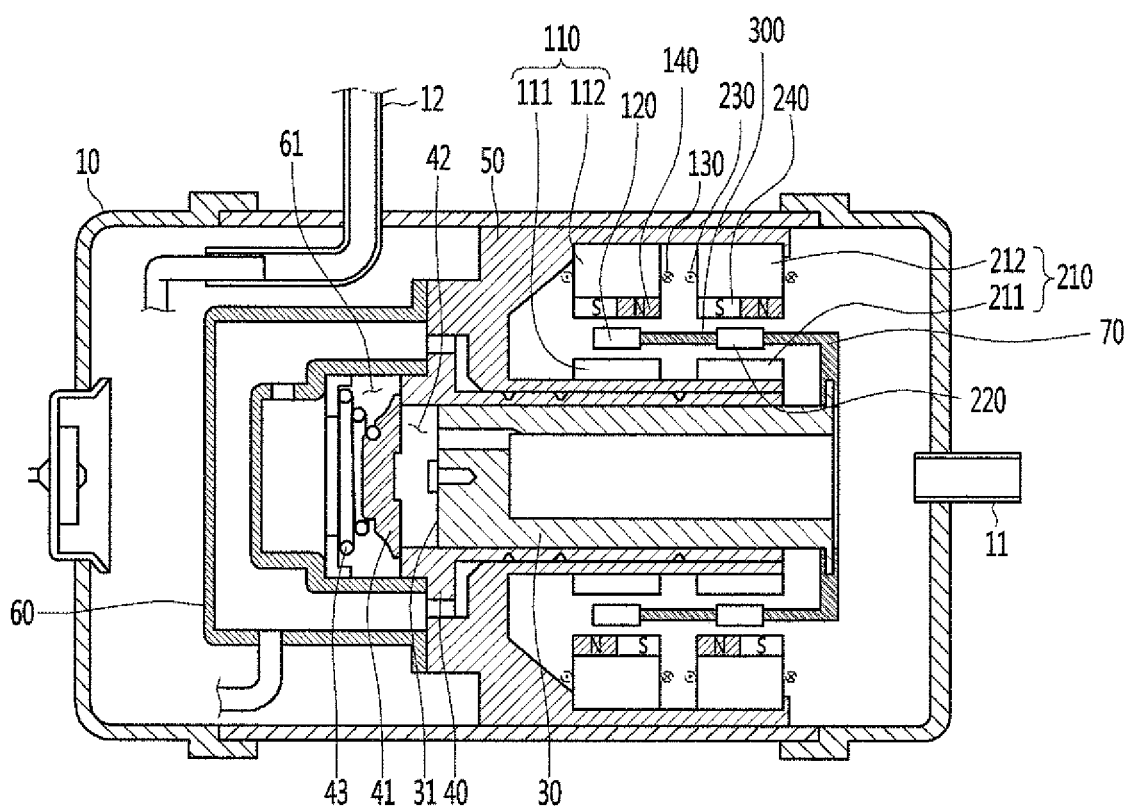
FIG. 1 is a longitudinal cross-sectional view of a reciprocating compressor including a transverse flux type reciprocating motor according to an embodiment.

FIG. 1 is a longitudinal cross-sectional view of a reciprocating compressor including a transverse flux type reciprocating motor according to an embodiment. Referring to FIG. 1, a reciprocating compressor 1 according to this embodiment may include a case 10 having an inner space, a reciprocating motor 20 disposed in the inner space of the case 10 to allow rotors 120 and 220 to reciprocate, a piston 30 coupled to the rotors 120 and 220 of the reciprocating motor 20 to reciprocate together with the rotors 120 and 220, a cylinder 40 into which the piston 30 is inserted to form a compression space 42, a suction valve 31 that opens and closes a suction side of the compression space 42, and a discharge valve 41 that opens and closes a discharge side of the compression space 42.

A suction tube 11 may be connected to the inner space of the sealed case 10, and a discharge tube 12 that guides a refrigerant compressed in the compression space 42 of the cylinder 40 to a refrigeration cycle may be connected to one side of the suction tube 11. Thus, the refrigerant suctioned into the inner space of the case 10 may be filled to increase a suction pressure, and the refrigerant discharged into the compression space 42 may be discharged to the outside of the case 10 toward a condenser through the discharge tube 12.

A frame 50 may be installed in the inner space of the case 10, and the reciprocating motor 20 that generates a reciprocating force and induces a resonance motion of the piston 30 may be fixed and coupled to one surface of the frame 50.

The compression space 42 may be defined inside the reciprocating motor 20, and the cylinder 40 may be inserted into the frame 50 and coupled thereto. The piston 30 may reciprocate within the cylinder 40 to vary a volume of the compression space 42 and thereby compress the refrigerant.

The suction valve 31 that opens and closes a suction passage of the piston 30 may be coupled to a front end surface of the piston 30, and the discharge valve 41 that opens and closes the compression space 42 of the cylinder 40 may be accommodated in a discharge cover 60 and then detachably coupled to the front end surface of the cylinder 40. A discharge space 61 may be defined in the discharge cover 60, and the discharge cover 60 may be fixedly coupled to the cylinder 40. The discharge valve 41 and a valve spring 43 that supports the discharge valve 41 may be accommodated in the discharge space 61 of the discharge cover 60, and an inlet of a gas bearing for lubrication between the cylinder 40 and the piston 30 may be accommodated in the discharge space 61. The gas bearing (not shown) may include a gas communication path defined between an inner circumferential surface of the frame 50 and an outer circumferential surface of the cylinder 40 and a plurality of fine gas through-holes passing from a center of the gas communication path to an inner circumferential surface of the cylinder 40.

As the reciprocating motor 20 includes components described with reference to FIGS. 2 to 8, their descriptions will be derived from the reciprocating motor which will be described hereinafter.

However, in this embodiment, stators 110 and 210 may be fixed to the frame 50, and the rotors 120 and 220 may be connected to the piston 30. Thus, when the rotors 120 and 220 reciprocate with respect to the stators 110 and 210, the piston 30 inserted into the cylinder 40 may reciprocate together with the rotors 120 and 220 in both directions.

As described above, in the reciprocating compressor 1 according to this embodiment, when alternate current is applied to magnet coils 130 and 230 of the reciprocating motor 20, an alternate flux may be generated between the stators 110 and 210, magnets 130 and 230, and the rotors 120 and 220, and thus, the rotors 120 and 220 and the piston 30 connected to the rotors 120 and 220 may move in a direction in which the flux due to the magnet coil 130 and 230 and the flux due to the magnets 140 and 240 are magnetized to increase and thereby to continuously reciprocate.

The piston 30 and the rotors 120 and 220 of the reciprocating motor may be connected to each other by a joint member or joint 70. For example, the joint member 70 may have a cylindrical shape to be connected to an inner or outer circumferential surface of each of the rotors 120 and 220, which have a cylindrical shape on the whole. For another example, the plurality of rotors 120 and 220, each of which may have an arc-shaped cross-section, may have a connection structure in which the rotors 120 and 220 are disposed to be spaced apart from each other along a circumference of the joint member 70.

Due to the above-described configuration, the piston 30 connected to the rotors 120 and 220 may linearly reciprocate between a bottom dead center (BDC) and a top dead center (TDC). When the piston 30 moves from the TDC to the BDC, a refrigerant may be suctioned into the cylinder 40, and when the piston 30 moves from the BDC to the TDC, the suctioned refrigerant may be compressed and then discharged to the outside of the cylinder 40.

Hereinafter, the reciprocating motor 20 will be described.

Figure 2:
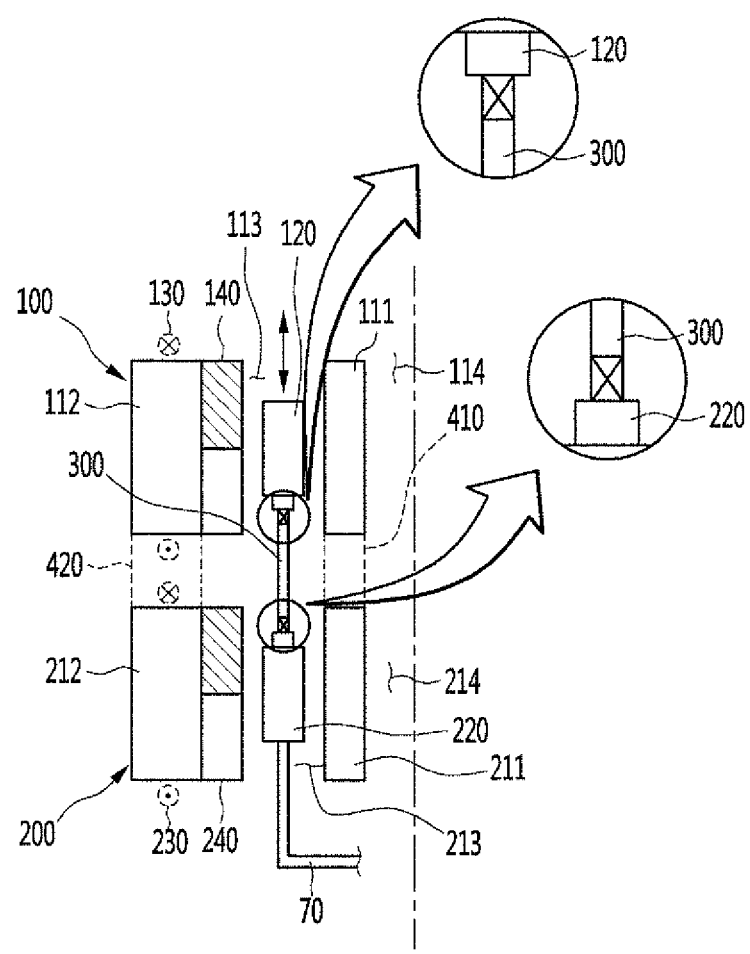
FIG. 2 is a schematic cross-sectional view of the transverse flux type reciprocating motor according to an embodiment.
Figure 3:
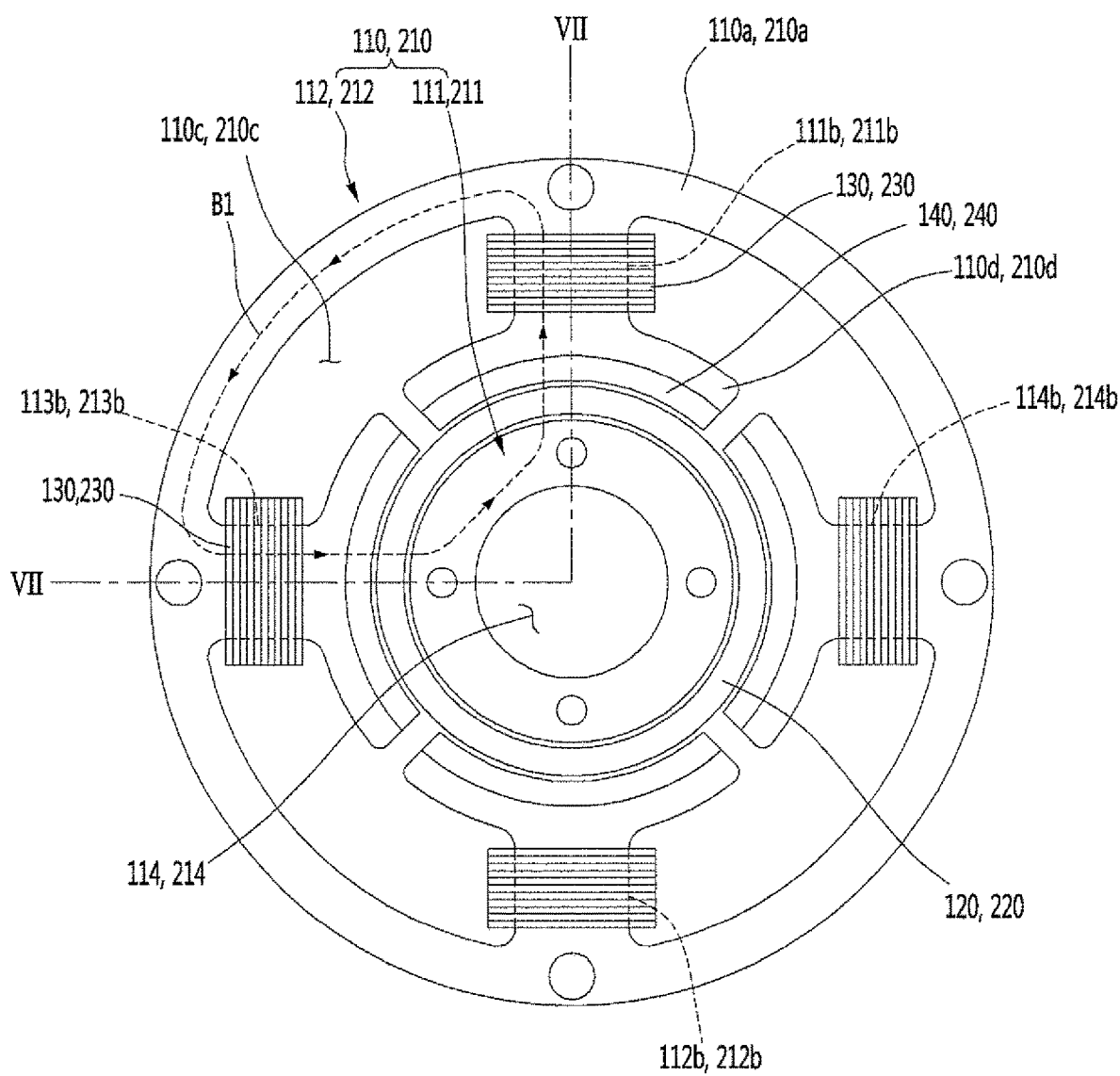
FIG. 3 is a plan view of the transverse flux type reciprocating motor according to an embodiment.
Figure 4:
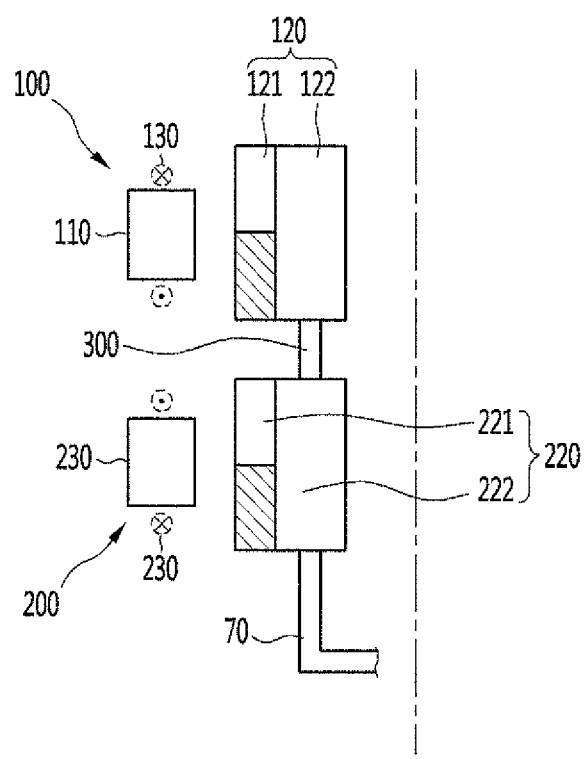
FIG. 4 is a schematic cross-sectional view of a transverse flux type reciprocating motor according to another embodiment.
Figure 5:
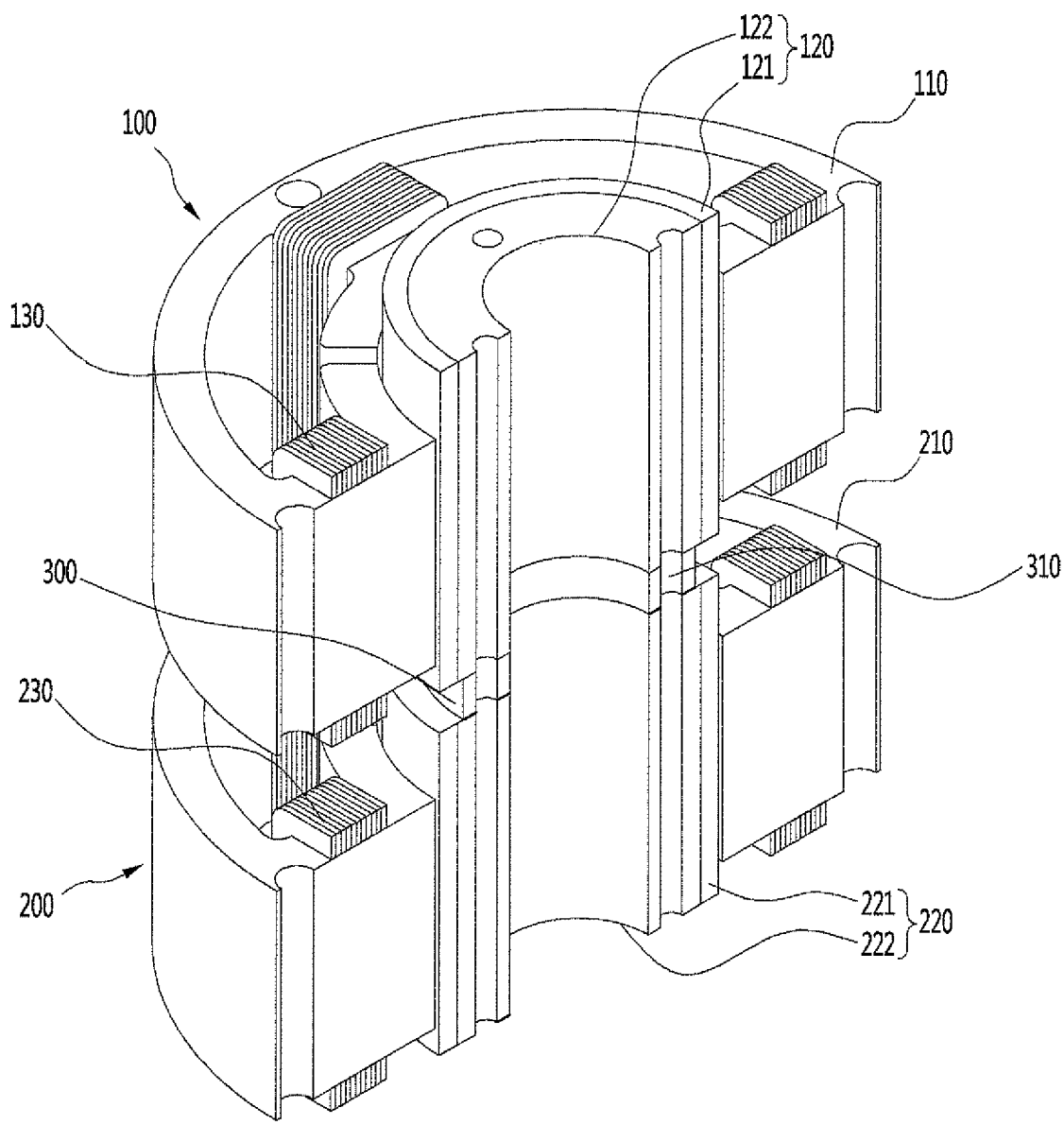
FIG. 5 is a partial cutaway perspective view of a transverse flux type reciprocating motor according to another embodiment.

FIG. 2 is a schematic cross-sectional view of the transverse flux type reciprocating motor according to an embodiment. FIG. 3 is a plan view of the transverse flux type reciprocating motor according to an embodiment. FIG. 4 is a schematic cross-sectional view of the transverse flux type reciprocating motor according to an embodiment. FIG. 5 is a partial cutaway perspective view of the transverse flux type reciprocating motor according to an embodiment.

Referring to FIGS. 2 to 5, the reciprocating motor according to an embodiment may include a first reciprocating module 100, a second reciprocating module 200, and a connection member 300. The first reciprocating module 100 may include a first stator 110 and a first rotor 120 that reciprocates with respect to the first stator 110, and the second reciprocating module 200 may include a second stator 210 disposed to be spaced apart from the first stator 110 in parallel to an axial direction and a second rotor 220 that reciprocates with respect to the second stator 210 in the axial direction. The connection member 300 may connect the first rotor 120 to the second rotor 220.

At least one of the stators 110 and 220 or the rotors 120 and 220 may have an arc shape in at least a portion of a cross-section in the axial direction. That is, at least one of the stators 110 and 210 or the rotors 120 and 220 may be provided as a single body and have a cylindrical shape with a hollow. Also, at least one of the stators 110 and 210 and the rotors 120 and 220 may have an arc-shaped cross-section and be provided as a plurality, which is disposed to be spaced apart from each other in a circumferential direction.

The stators 110 and 210 and/or the rotors 120 and 220 may be made of a magnetic or conductive material. Thus, a flux may flow by the magnet coils 130 and 230 which will be described hereinafter.

For example, the first stator 110 may include a first inner stator 111 and a first outer stator 112 disposed with a first gap 113 in a radial outward direction of the first inner stator 111, and the second stator 210 may include a second inner stator 211 disposed to be spaced apart from the first inner stator 111 in parallel to the axial direction and a second outer stator 212 disposed with a second gap 213 in a radial outward direction of the second inner stator 211. In this case, the first rotor 120 may be disposed in the first gap 113, and the second rotor 220 may be disposed in the second gap 213.

However, embodiments are not limited thereto. For example, although the stators 110 and 210 are formed by the inner stators 111 and 211 and the outer stators 112 and 212 in this embodiment, the stators 110 and 210 may be formed by only the inner stators 111 and 211 or by only the outer stators 112 and 212.

When the stators 110 and 210 are formed by only the inner stators 111 and 211, the rotors 120 and 220 may be disposed to be spaced outward from the stators 110 and 210. The magnets 140 and 240 may be attached to outer circumferential surfaces of the inner stators 111 and 211 facing the rotors 120 and 220, or the magnets 121 and 221 may be disposed on inner circumferential surfaces of the rotors 120 and 220 facing the inner stators 111 and 211.

Also, when the stators 110 and 210 are formed by only the outer stators 112 and 212, the rotors 120 and 220 may be disposed to be spaced inward from the stators 110 and 210. The magnets 140 and 240 may be attached to inner circumferential surfaces of the outer stators 112 and 212 facing the rotors 120 and 220, or the magnets 121 and 221 may be disposed on outer circumferential surfaces of the rotors 120 and 220 facing the outer stators 112 and 212.

Also, when the stators 110 and 210 are formed by the inner stators 111 and 211 and the outer stators 112 and 212, each of the inner stators 111 and 211 may have an outer diameter less than an outer diameter of each of the outer stators 112 and 212, and gaps 113 and 213, in which the rotors 120 and 220 may be respectively disposed, may be defined between the inner stators 111 and 211 and the outer stators 112 and 212.

The inner stators 111 and 211 or the rotors 120 and 220 may have hollow parts or hollows 114 and 214. The hollow parts 114 and 214 may be utilized as spaces in which the piston may be disposed.

Also, side surfaces, which face each other, of the first stator 110 and the second stator 210 may be connected to each other through spaces 410 and 420. If the stators 110 and 210 are formed by the inner stators 111 and 211 and the outer stators 112 and 212, the spacers 410 and 420 may include an inner spacer 410 and an outer spacer 420.

As described above, when the first stator 110 and the second stator 210 are connected to each other through the spacers 410 and 420, the first stator 110 and the second stator 210 may be maintained to be spaced a predetermined distance from each other. Also, the first stator 110 and the second stator 210 may be a single body.

The rotors 120 and 220 may reciprocate with respect to the stators 110 and 210, respectively. When the stators 110 and 210 are formed by the inner stators 111 and 211 and the outer stators 112 and 212, the rotors 120 and 220 may be inserted into the gaps 113 and 213 defined between the inner stators 111 and 211 and the outer stators 112 and 212 to reciprocate.

In this embodiment, at least a portion of each of the rotors 120 and 220 may have an arc shape in a cross-section in the axial direction. That is, the rotors 120 and 220 may be provided as a single body and have a cylindrical shape to be inserted into the cylindrical gaps 113 and 213 defined between the cylindrical inner stators 111 and 211 and the cylindrical outer stators 112 and 212.

When the rotors 120 and 220 are viewed in the axial direction, the rotors 120 and 220 may have the arc-shaped cross-section and be provided as a plurality spaced apart from each other in a circumferential direction. In this case, a space may be defined between the rotors 120 and 220, and a connection part or connector made of a nonmagnetic material may be disposed in the space. The plurality of rotors 120 and 220 may be coupled to each other through the connection part to form one body.

The magnet coils 130 and 230 may be wound around the first stator 110 and/or the second stator 210. For example, when the stators 110 and 210 include the outer stators 112 and 212, the magnet coils 130 and 230 may be wound around the outer stators 112 and 212. When the stators 110 and 210 include the inner stators 111 and 212, the magnet coils 130 and 230 may be wound around the inner stators 111 and 211.

The magnet coils 130 and 230 may be directly wound around the inner stators 111 and 211 or the outer stators 112 and 212. Also, after the magnet coils 130 and 230 are wound, the inner stators 111 and 211 or the outer stators 112 and 212 may be coupled to the wound magnet coils 130 and 230. That is, after the magnet coils 130 and 230 are wound around a bobbin through a separate winding device, the magnet coils 130 and 230 may be coupled to the inner stators 111 and 211 or the outer stators 112 and 212 in a manner in which the inner stators 111 and 211 or the outer stators 112 and 212 are inserted into a hollow the bobbin.

The magnets 121, 140, 221, and 240 may be disposed on the stators 110 and 210 or the rotors 120 and 220. For example, the magnets 140 and 240 may be attached to the stators 110 and 210. That is, a first magnet 140 and a second magnet 240 may be attached to surfaces of the first and second stators 110 and 210 facing the first and second rotors 120 and 220, respectively.

If the stators 110 and 210 are formed by the inner stators 111 and 211 and the outer stators 112 and 212, the magnets 140 and 240 may be attached to inner circumferential surfaces of the outer stators 112 and 212 or outer circumferential surfaces of the inner stators 111 and 211. On the other hand, if the stators 110 and 210 are formed by only the inner stators 111 and 211, the magnets 140 and 240 may be attached to the outer circumferential surfaces of the inner stators 111 and 211. Also, if the stators 110 and 210 are formed by only the outer stators 112 and 212, the magnets 140 and 240 may be attached to the inner circumferential surfaces of the outer stators 112 and 212.

For another example, the first rotor 120 and the second rotor 220 may include a third magnet 121 and a fourth magnet 221, respectively. The first rotor 120 may be formed by only the third magnet 121 or be formed by only a first rotor core 122 and a third magnet 121 attached to an inner or outer circumferential surface of the first rotor core 122. In a case of the latter, the third magnet 121 may be attached to face the first stator 110. Also, the third magnet 121 may be connected to the connection member 300, and the first rotor core 122 may be connected to the connection member 300.

Also, the second rotor 220 may be formed by only the fourth magnet 221 or be formed by only a second rotor core 222 and a fourth magnet 221 attached to an inner or outer circumferential surface of the second rotor core 222. In a case of the latter, the fourth magnet 221 may be attached to face the second stator 210. Also, the fourth magnet 221 may be connected to the connection member 300, and the second rotor core 222 may be connected to the connection member 300.

The magnets 121, 140, 221, and 240 may have different magnetic poles arranged in a reciprocating direction (axial direction) of the rotors 120 and 220. For example, each of the magnets 121, 140, 221, and 240 may include a 2-pole magnet having an N pole and an S pole, which may be disposed on both sides thereof and have a same length.

Each of the magnets 121, 140, 221, and 240 may have a circle shape or an arc shape in cross-section to come into contact with each of surfaces of the stators 110 and 210 or the rotors 120 and 220. That is, each of the magnets 121, 140, 221, and 240 may have the cylindrical shape or have the arc-shaped cross-section when viewed in the axial direction. The magnets 121, 140, 221, and 240 may be provided as a plurality so that the magnets 121, 140, 221, and 240 may be disposed to be spaced apart from each other in a circumferential direction on surfaces of the stators 110 and 210 or the rotors 120 and 220.

A space may be defined between the magnets 121, 140, 221, and 240. Also, the magnets 121, 140, 221, and 240 may be arranged to have magnetic poles different from magnetic poles of the magnets 121, 140, 221, and 240, which are adjacent in the circumferential direction.

In this embodiment, the stators 110 and 210 and/or the rotors 120 and 220 may be provided as a single body. In some cases, the plurality of blocks may be stacked to form the stators 110 and 210 and/or the rotors 120 and 220.

That is, the stators 110 and 210 and/or the rotors 120 and 220 may be formed by axially stacking a plurality of stator blocks and/or rotor blocks. When the stators 110 and 210 and/or the rotors 120 and 220 are formed by axially stacking the plurality of stator blocks and/or rotor blocks as described above, the axial stacking may be easily performed when compared to the radial stacking according to the related art. Also, the axially stacked state may be easily maintained when compared to the radially stacked state.

Referring again to FIG. 3, the first stator 110 and/or the second stator 210 may include yoke parts or yokes 110a and 210a that provide magnetic paths and teeth parts or teeth 111b to 114b and 211b to 214b that extend from inner surfaces of the yoke parts 110a and 210a in a central direction. The magnet coils 130 and 230 may be wound around the yoke parts 110a and 210a or the teeth parts 111b to 114b and 211b to 214b.

For example, each of the yoke parts 110a and 210a may have an annular shape, and the teeth parts 111b to 114b and 211b to 214b may extend in a radial direction on inner surfaces of the yoke parts 110a and 210a. Also, space parts or spaces 110c and 210c may be defined between the teeth parts 111b to 114b and 211b to 214b, and the magnet coils 130 and 230 may be wound. Thus, the teeth parts 111b to 114b and 211b to 214b and the space parts 110c and 210c may be alternately provided along the circumferential direction.

An even number of teeth parts 111b to 114b and 211b to 214b may be disposed at a predetermined distance along the circumferential direction of the stators 110 and 210, and the magnet coils 130 and 230 coupled to the teeth parts 111b to 114b and 211b to 214b may have fluxes in a direction opposite to the magnet coils 130 and 230, which are adjacent thereto. That is, the magnet coils 130 and 230 may be wound to alternate in a winding direction along the circumferential direction. Thus, the flux direction of the teeth parts 111b to 114b and 211b to 214b may be opposite to that of the different teeth parts 111b to 114b and 211b to 214b, which are adjacent in the circumferential direction.

Also, the yoke parts 110a and 210a and/or the teeth parts 111b to 114b and 211b to 214b may be separated from each other. In this case, the magnet coils 130 and 230 may be coupled to the stators 110 and 210 in the previously wound state to form hollows. That is, the yoke parts 110a and 210a may be inserted into hollows of the magnet coils 130 and 230 and then connected to the teeth parts 111b to 114b and 211b to 214b, or the teeth parts 111b to 114b and 211b to 214b may be inserted into the hollow of the magnet coils 130 and 230 and then connected to the yoke parts 110a and 210a.

For example, the yoke parts 110a and 210a and the teeth parts 111b to 114b and 211b to 214b may be separated from each other and then integrally connected to each other. For another example, the yoke parts 110a and 210a may be separated into a plurality of parts and then integrally connected to each other.

For another example, the teeth parts 111b to 114b and 211b to 214b may be separated into a plurality of parts and then integrally connected to each other.

As described above, the plurality of yoke parts 110a and 210a and/or the teeth parts 111b to 114b and 211b to 214b, which may be separated in various shapes, may be inserted into the hollows of the magnet coils 130 and 230 and then connected to each other. The yoke parts 110a and 210a and/or the teeth parts 111b to 114b and 211b to 214b, which may be separated from each other, may be bonded to each other through, for example, welding to form one body.

When the yoke parts 110a and 210a and/or the teeth parts 111b to 114b and 211b to 214b are separated into a plurality as described above, the magnet coils 130 and 230 may not be wound around the yoke parts 110a and 210a and/or the teeth parts 111b to 114b and 211b to 214b by using a winding device (not shown), but rather, may be coupled to the stators 110 and 210 by inserting the yoke parts 110a and 210a and/or the teeth parts 111b to 114b and 211b to 214b into the hollows of the magnet coils 130 and 230 after manufacturing the plurality of magnet coils 130 and 230, each of which may have an annular shape.

Also, each of the teeth parts 111b to 114b and 211b to 214b may have a width less than that of each of the yoke parts 110a and 210a. Thus, an area of the magnetic path in the teeth parts 111b to 114b and 211b to 214b may be secured to improve performance of the motor.

Referring again to FIG. 3, the teeth parts 111b to 114b and 211b to 214b may include first teeth parts 111b and 211b that extend downward from inner upper ends of the yoke parts 110a and 210a, second teeth parts 112b and 212b that extend upward from inner lower ends of the yoke parts 110a and 210a, third teeth parts 113b and 213b that extend from a left or first lateral side to a right or second lateral side of the yoke parts 110a and 210a, and fourth teeth parts 114b and 214b that extend from the right side to the left side of the yoke parts 110a and 210a.

Stator pole parts or poles 110d and 210d to which the magnets 140 and 240 may be fixed may lengthily extend from both sides of inner ends of the teeth parts 111b to 114b and 211b to 214b in the circumferential direction. When each of the stator pole parts 110d and 210d has a circumferential length greater than that of each of the magnets 140 and 240, the stator pole parts 110*d* and 210*d* have an influence on other magnets, each of the stator pole parts 110*d* and 210*d* may have a circumferential length equal to or less than that of each of the magnets 140 and 240 as much as possible. For example, each of the stator pole parts 110*d* and 210*d* may have a same circumferential length as each of the magnets 140 and 240 which will be described hereinafter.

The reciprocating motor including the above-described components according to an embodiment may reciprocate by a centering force in the reciprocating direction, which is generated between the stators 110 and 210 around which the magnet coils 130 and 230 are wound, the magnets 121, 140, 221, and 240, and the rotors 120 and 220. The centering force in the reciprocating direction means a force stored toward a side to which the magnetic energy (magnetic position energy, magnetic resistance) is lowered when the rotors 120 and 220 move within magnetic fields, and this force may generate magnetic spring. That is, in this embodiment, when the rotors 120 and 220 reciprocate by the magnetic force due to the magnet coils 130 and 230 and the magnets 121, 140, 221, and 240, the rotors 120 and 220 may accumulate a force that intends to return to the centering direction by the magnetic spring, and thus, the rotors 120 and 220 may continuously reciprocate while being resonant due to the force accumulated in the magnetic spring.

Hereinafter, an operation principle of the transverse flux type reciprocating motor according to this embodiment will be described.

Figure 7:
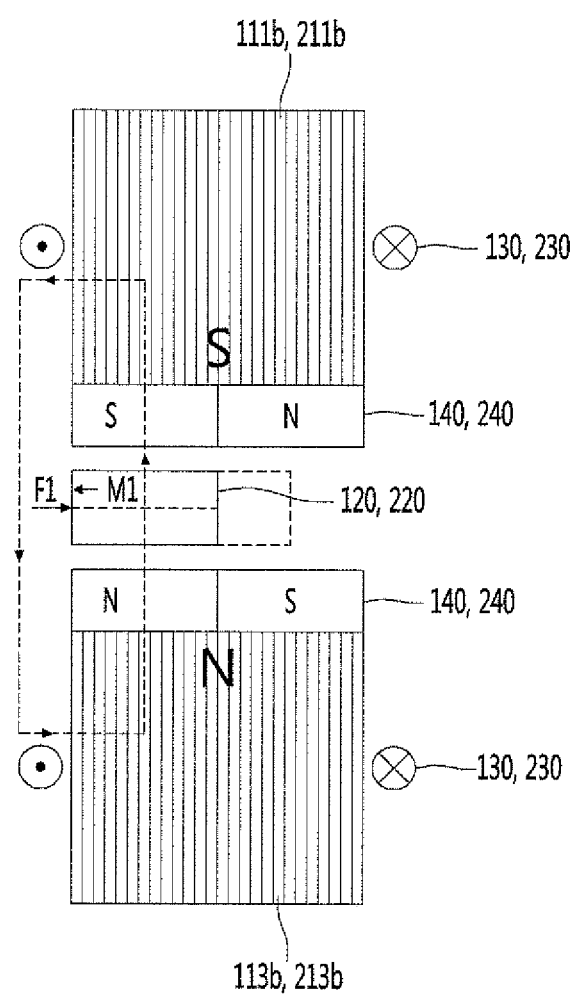
FIGS. 7 and 8 are schematic views taken along line VII-VII of FIG. 3 so as to explain an operation of the transverse flux type reciprocating motor according to an embodiment.
Figure 8:
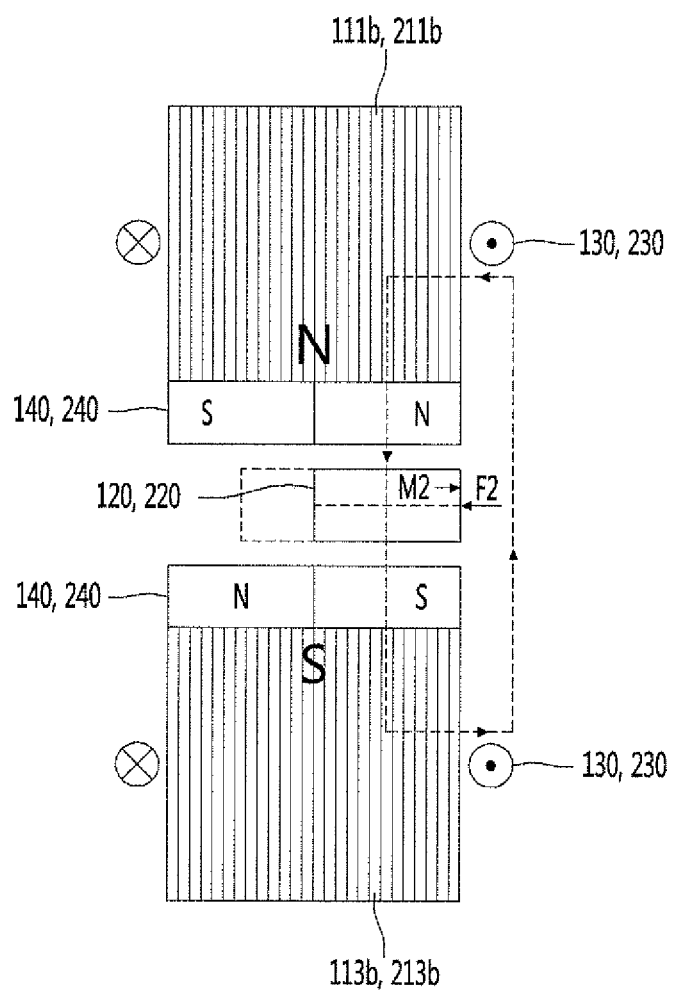

FIGS. 7 and 8 are schematic views taken along line VII-VII of FIG. 3 so as to explaining an operation of the reciprocating motor according to an embodiment. First, when an alternate current is applied to the magnet coils 130 and 230 of the reciprocating motor, an alternate magnetic flux is generated between the stators 110 and 210. In this case, the rotors 120 and 220 may move in both directions along the flux direction to continuously reciprocate.

A magnetic resonance spring may be generated between the rotors 120 and 220, the stators 110 and 210, and the magnets 140 and 240 within the reciprocating motor to induce resonance motions of the rotors 120 and 220. For example, as illustrated in FIG. 7, in a state in which the magnets 140 and 240 are fixed to the stators 110 and 210, when current is applied in a direction opposite to the magnet coils 130 and 230 wound around the first teeth parts 111*b* and 211*b* and the third teeth parts 113*b* and 213*b*, both fluxes may be mixed in the teeth parts 111*b*, 113*b*, 211*b*, and 213*b* to flow in a same direction so that both teeth parts 111*b*, 113*b*, 211*b*, and 213*b* have a same magnetic pole. The rotors 120 and 220 which are made of magnetic materials move in a leftward direction (see an arrow M1) in which the flux due to the magnet coils 130 and 230 and the flux due to the magnets 140 and 240 increase.

A centering force F1 (see arrow F1) that intends to return to a rightward direction in the drawing in which the magnetic energy (that is, the magnetic position energy or the magnetic resistance) is lowered may be accumulated between the rotors 120 and 220, the stators 110 and 210, and the magnets 140 and 240. In this state, as illustrated in FIG. 8, when the current applied to the magnet coils 130 and 230 is changed in direction, both teeth parts 111*b*, 113*b*, 211*b*, and 213*b* may have magnetic pole opposite to the previous magnetic pole, and the flux due to the magnet coils 130 and 230 and the flux due to the magnets 140 and 240 may also increase in a direction opposite to the previous direction, that is, in the rightward direction in the drawing.

The rotors 120 and 220 may move in the rightward direction (see arrow M2) in the drawing by the accumulated centering force F1 and the magnetic force due to the fluxes of the magnet coils 130 and 230 and the magnets 140 and 240. In this process, the rotors 120 and 220 may pass through centers of the magnets 140 and 240 by the inertial force and the magnetic force to further move to the right side in the drawing.

Likewise, a centering force F2 which intends to return to the centering direction of the magnets 140 and 240 in which the magnetic energy is lower, that is, the leftward direction in the drawing may be accumulated between the rotors 120 and 220, the stators 110 and 210, and the magnets 140 and 240.

In this state, referring again to FIG. 7, when the current applied to the magnet coils 130 and 230 is changed in direction, both teeth parts 111*b*, 113*b*, 211*b*, and 213*b* may have magnetic pole opposite to the previous magnetic pole, and the rotors 120 and 220 may move in the centering direction of the magnets 140 and 240 by the accumulated centering force F2 and the magnetic force due to the fluxes of the magnet coils 130 and 230 and the magnets 140 and 240.

The rotors 120 and 220 may pass through the centers of the magnets 140 and 240 to further move to the leftward direction in the drawing by the inertial force and the magnetic force, and the centering force F1 that intends to return to the centering direction of the magnets 140 and 240 in which the magnetic energy is lower, that is, the rightward direction in the drawing may be accumulated between the rotors 120 and 220, the stators 110 and 210, and the magnets 140 and 240. While this process is repeated, the rotors 120 and 220 may continuously repeat the reciprocating motion that alternately moves to the right side and the left side in the drawing, like the case in which the mechanical resonance spring is provided.

Referring to FIG. 5, the connection member 300 connects side surfaces, which face each other, of the first rotor 120 and the rotor 220 to each other. Thus, the first rotor 120 and the second rotor 220 may be integrally connected to each other to reciprocate in parallel to the axial direction.

Figure 6:
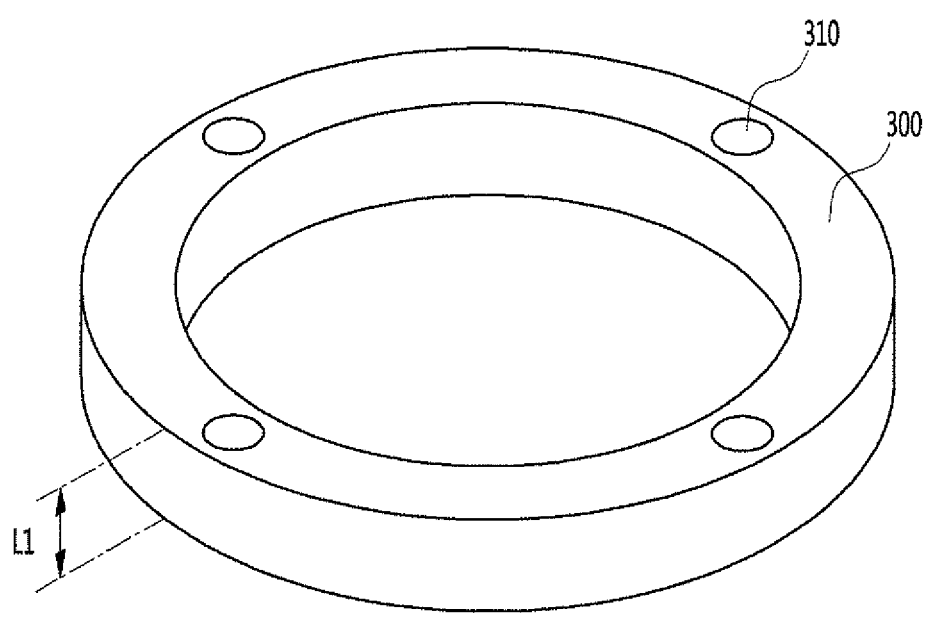
FIG. 6 is a perspective view of a connection member according to an embodiment.

FIG. 6 is a perspective view of a connection member according to an embodiment. Referring to FIG. 6, the connection member 300 may be made of a nonmagnetic material and have a hollow ring shape, for example. A bolt hole 310 may be defined in the connection member 300 in parallel to the axial direction, and thus, the connection member 300 may be coupled to the rotors 120 and 220 by a bolt.

The connection member 300 may be adjustable in length L1 in the axial direction. As the connection member 300 is adjusted in length, a distance between the first rotor 120 and the second rotor 220 may be adjusted.

Figure 9:
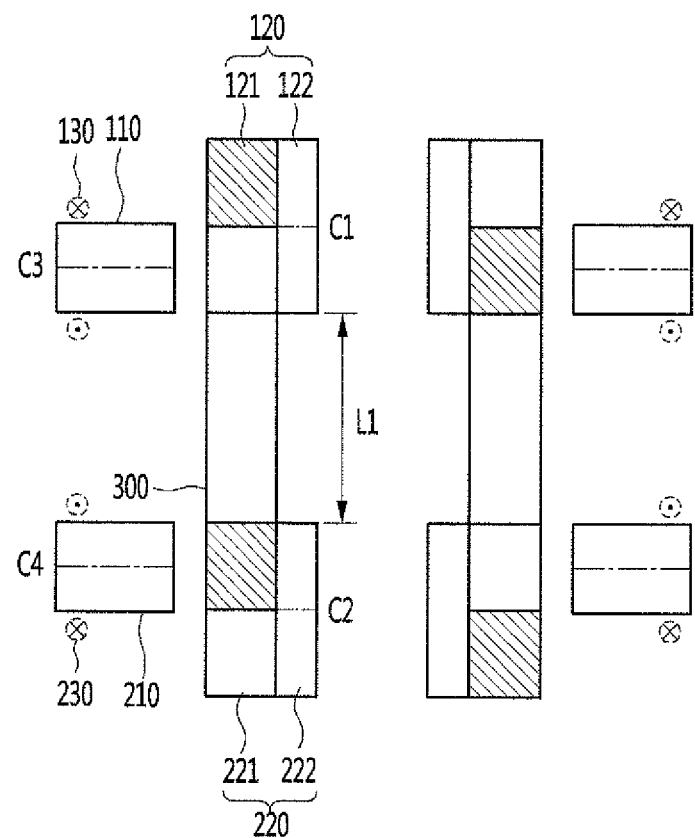
FIGS. 9 and 10 are cross-sectional views illustrating a state in which a rotor is offset according to a variation in length of the connection member in FIG. 5.
Figure 10:
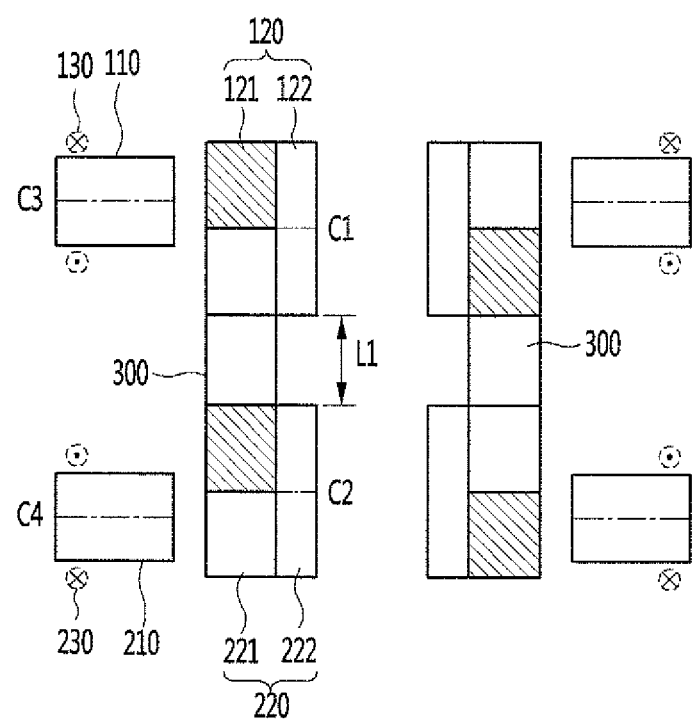

FIGS. 9 and 10 are cross-sectional views illustrating a state in which the rotor is offset according to a variation in length of the connection member in FIG. 5. In general, centers C1 and C2 of the magnets 121 and 122 attached to the rotors 120 and 220 may match centers C3 and C4 of the stators 110 and 210. In this state, as illustrated in FIG. 9, when the connection member 300 increases in length L1, the distance between the rotors 120 and 220 may increase.

As described above, when the distance between the rotors 120 and 220 increases, the centers C1 and C2 of the magnets 121 and 122 attached to the rotors 120 and 220 may move in a direction (in an outward direction) which is away from each other to cause an offset with respect to the centers C3 and C4 of the stators 110 and 210. On the other hand, as illustrated in FIG. 10, when the connection member 300 decreases in length L1, the distance between the rotors 120 and 220 may decrease.

As described above, when the distance between the rotors 120 and 220 decreases, the centers C1 and C2 of the magnets 121 and 122 attached to the rotors 120 and 220 may move in a direction (in an inward direction) which is closer to each other to cause an offset with respect to the centers C3 and C4 of the stators 110 and 210.

For reference, as illustrated in FIG. 2, in a case in which the magnets 140 and 240 are attached to the stators 110 and 210, when the connection member 300 is changed in length, the distance between the first rotor 120 and the second rotor 220 may be adjusted to mismatch the centers of the magnets 140 and 240 attached to the stators 110 and 210 with the centers of the rotors 120 and 220 and thereby to cause an offset. The more the connection member 300 increases in length L1, the more the centers of the first and second stators 110 and 210 in the axial direction and the centers of the first and second rotors 120 and 220 in the axial direction may mismatch each other to increase the offset degree.

Also, the connection member 300 may be detachably fixed to the first rotor 120 and/or the second rotor 220. Thus, the connection member 300 having various lengths may be provided and then be selectively used according to situations.

Also, the connection member 300 may vary in length L1. That is, the connection member 300 may have a retractile structure. In this case, the connection member 300 may be adjusted in length L1 without separating the connection member 300 from the rotors 120 and 220.

As described above, an effect due to the connection member having the adjustable length will be described hereinafter.

Figure 14:
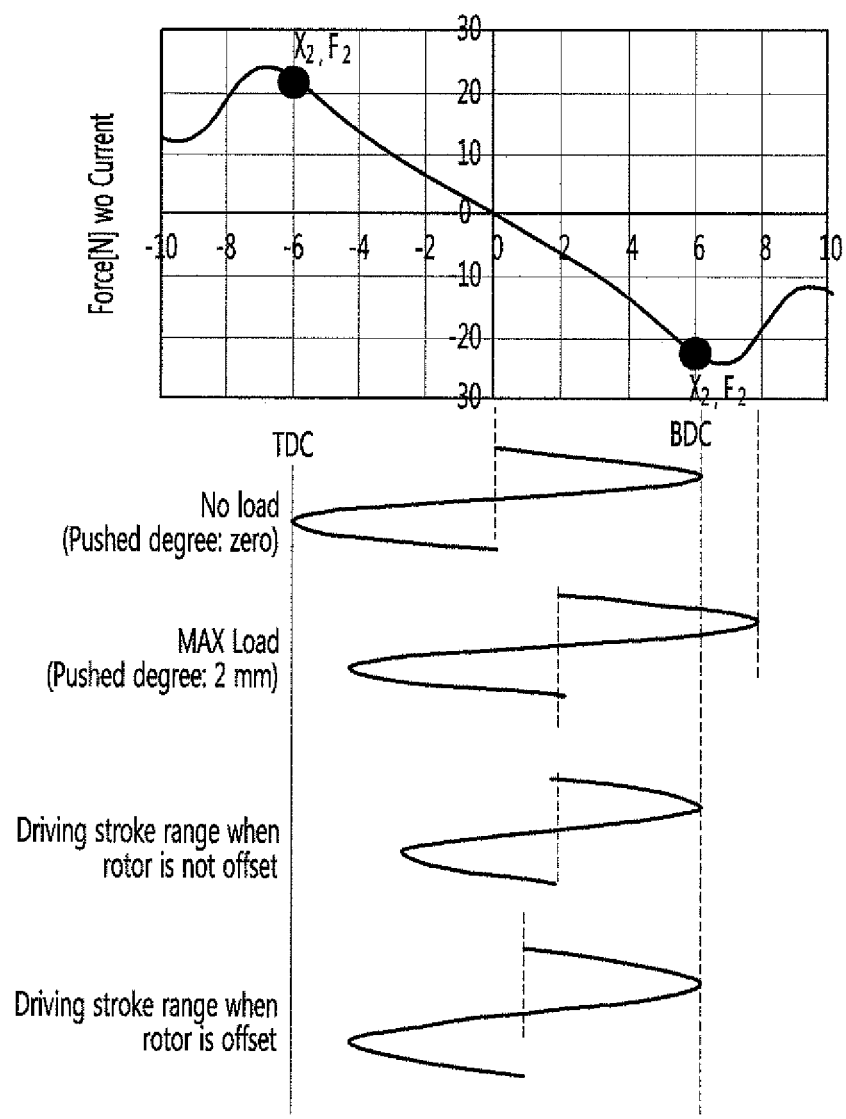
FIG. 14 is a view illustrating a stroke range of the rotor while a refrigerant is compressed.

FIG. 14 is a view illustrating a stroke range of the rotor while the refrigerant is compressed. Referring to FIG. 14, the rotors 120 and 220 reciprocates between the TDC and the BDC due to the alternate current applied to the magnet coils 130 and 230. Hereinafter, a distance between the TDC and the BDC is called a "drive stroke".

While the rotors 120 and 220 move to the BDC, the refrigerant in the compression space 42 may be suctioned. Also, while the rotors 120 and 220 move to the TDC, the piston 30 may compress the refrigerant within the compression space 42.

In general, when the flux due to the magnet coil does not flow, the rotors 120 and 220 do not move. In this state, the center of each of the rotors 120 and 220 in the axial direction (reciprocating direction) and the center of each of the stators 110 and 210 in the axial direction (reciprocating direction) match each other.

Thereafter, when the alternate current flows through the magnet coils 130 and 230, the piston 30 fixed to the rotors 120 and 220 reciprocates while the rotors 120 and 220 reciprocate. In this process, the refrigerant within the compression space 42 may be compressed.

However, while the piston 30 compresses the refrigerant within the compression space 42 as described above, a pressure may be applied to the piston 30 to allow the piston 30 to be pushed in a direction away from the discharge valve 41. That is, the piston 30 may be pushed by a predetermined distance toward the BDC.

In this case, the centers of the rotors 120 and 220 move in a direction toward the BDC. Also, the rotors 120 and 220 are controlled so that the rotors 120 and 220 are not out of the BDC.

Thus, a first stroke from the centers of the rotors 120 and 220 to the BDC may decrease in length. Also, as a second stroke from the centers of the rotors 120 and 220 to the TDC has a same length as the first stroke, the drive stroke of the rotors 120 and 220 may be reduced. Thus, in the compression process, it is necessary to compensate the distance by which the piston 30 is pushed toward the BDC.

In this specification, the rotor 120 of the first reciprocating module 100 and the rotor 220 of the second reciprocating module 200 may be connected to each other through the connection member 300, and also, the connection member 300 may be adjusted in length so that the centers of the rotors 120 and 220 and the centers of the magnets 140 and 240 attached to the stators 110 and 210 are adjusted to mismatch each other, or the centers of the magnets 121 and 221 constituting the rotors 120 and 220 and the center of the stators 110 and 210 are adjusted to mismatch each other. In the compression process using this manner, the distance by which the piston 30 and the rotors 120 and 220 are pushed toward the BDC by the pressure may be compensated.

For example, if the stators 110 and 210 are fixed, when the connection member 300 increases in length, the distance between the rotors 120 and 220 may increase, and thus, the rotor 120 which is adjacent to the TDC may be offset to the TDC. Thus, in the compression process, the distance by which the center of the rotor 120 is pushed toward the BDC may be minimized. Therefore, the drive stroke of each of the rotors 120 and 220 may increase to improve compression efficiency.

Figure 11:
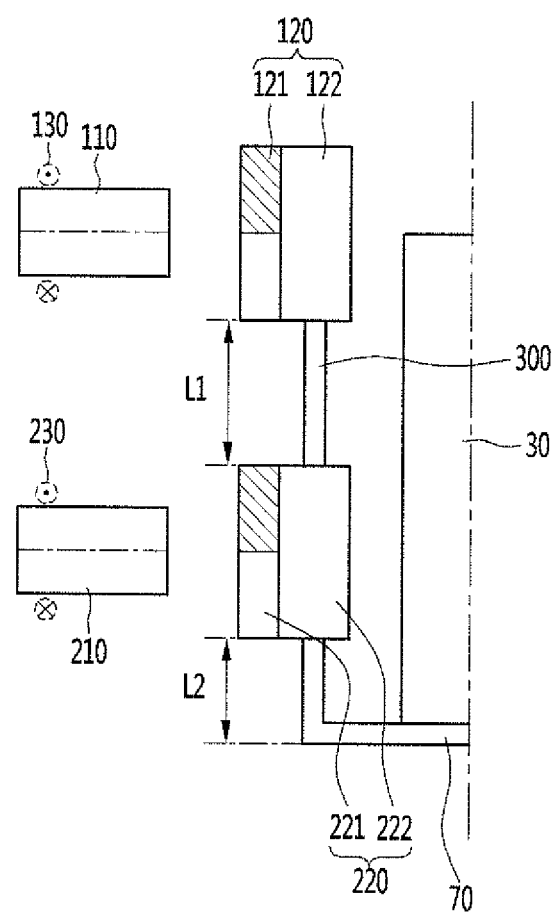
FIG. 11 is a view of a stator, a rotor, a connection member, and a piston of FIG. 1.
Figure 12:
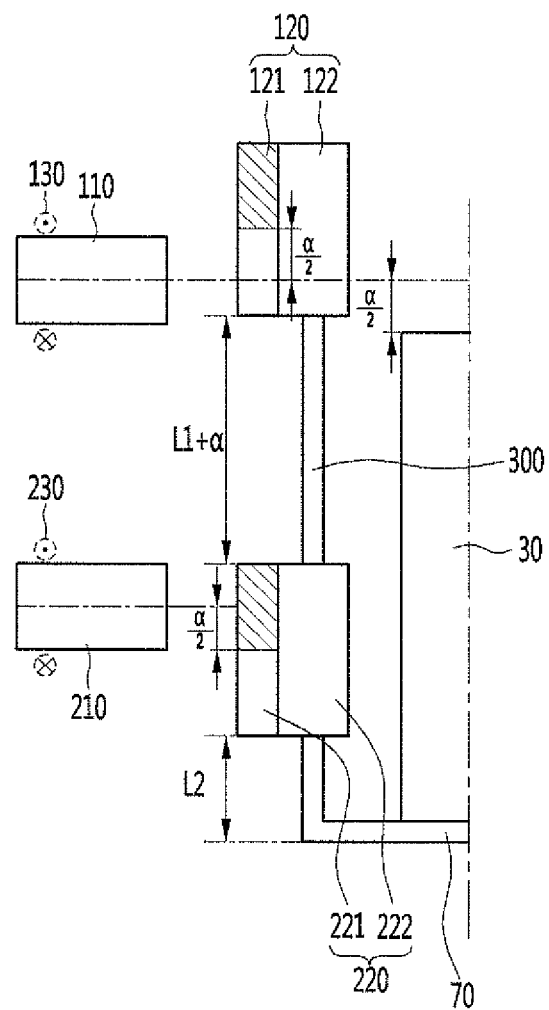
FIG. 12 is a view illustrating a state in which the connection member increases only in length in FIG. 11.
Figure 13:
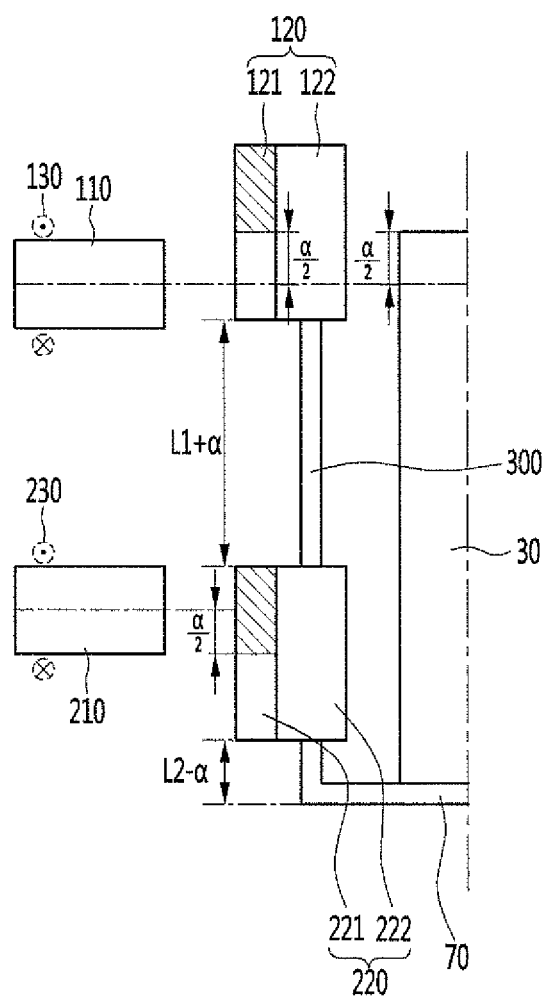
FIG. 13 is a view illustrating a state in which the connection member increases in length, and a joint member decreases in length in FIG. 11.

FIG. 11 is a view of the stator, the rotor, the connection member, and the piston in FIG. 1. FIG. 12 is a view illustrating a state in which the connection member increases only in length in FIG. 11. FIG. 13 is a view illustrating a state in which the connection member increases in length, and a joint member decreases in length in FIG. 11.

Referring to FIG. 13, when the connection member 300 connecting the first and second rotors 120 and 220 to each other increases in length L1 by a distance α, the joint member 70 connecting the rotors 120 and 220 to the piston 30 may decrease in length L2 by the distance α. Referring to FIGS. 11 and 12, in a state in which a length L2 of the joint member 70 connecting the rotors 110 and 220 to the piston 30 is maintained, when the connection member 300 increases by the length L1 by the distance α, the first rotor 120 is offset by the distance α/2 toward the TDC.

However, the second rotor 220 may be offset by a distance α/2 toward the BDC as opposed to the first rotor 120, and thus, the piston 30 connected to the second rotor 220 through the joint member 70 may be offset by the distance α/2 toward the BDC. In this case, the piston 300 may be further reduced in drive stroke.

To prevent this phenomenon from occurring, when the connection member 300 connecting the first and second rotors 120 and 220 to each other increases in length L1 by the distance α, the joint member 70 has to decrease in length L2 by the distance α. That is, as illustrated in FIG. 13, when the joint member 70 connecting the rotors 120 and 220 to the piston 30 decreases in length L2 by the distance α while the connection member 300 increases in length L1 by the distance α, the first rotor 120 is offset by the distance α/2 toward the TDC, and thus, the piston 30 connected to the second rotor 220 may be offset by the distance α/2 toward the TDC even though the second rotor 220 is offset by the distance α/2 toward the BDC.

Although not shown, when the connection member 300 connecting the first and second rotors 120 and 220 to each other increase in length L1 by the distance α, the joint member 70 may not be changed in length. Thus, a front end of the piston 30 connected to the second rotor 220 may be offset by the distance α/2 toward the TDC in the manner in which the piston 30 increases in length by the distance α. Thus, in the compression process, the distance by which the piston 30 and the rotors 120 and 220 are pushed toward the BDC by the pressure may be compensated, and thus, the drive stroke of each of the rotors 120 and 220 and the drive stroke of the piston 300 may increase together to improve the compression efficiency.

According to the embodiments disclosed herein, the rotor may be adjusted in drive stroke. Also, the rotor may increase in drive stroke when the rotor decreases in drive stroke.

Further, the rotor may be resonant by the magnetic resonance spring to previously prevent the phenomenon in which use frequency is limited within the drive frequency in a certain section from occurring, thereby improving efficiency of the motor. Furthermore, the rotor may be resonant by the magnetic resonance spring to reduce a number of components for the resonance of the rotor, thereby further reducing a transverse length of the motor.

Also, according to embodiments disclosed herein, the rotor may be resonant by the magnetic resonance spring to prevent the rotor from eccentrically moving by a lateral force of the resonance spring, thereby reducing friction loss and noise. The magnet may be coupled to an end of the stator to reduce a weight of the rotor, and thus, power consumption may be reduced to improve efficiency of the motor.

According to embodiments disclosed herein, the stator and the rotor may be easily manufactured to reduce manufacturing costs. Additionally, blocks constituting the stator or the rotor may come into surface contact with each other and be stacked in the axial direction, and thus, the blocks may be easily stacked when stacked in the radial direction, and the stacked state may be easily maintained.

According to embodiments disclose herein, the magnet coil may be wound around the bobbin. Then, the outer stator may be inserted to be coupled to a hollow of the bobbin, thereby improving workability.

According to embodiments disclosed herein, the reciprocating motor may be provided to realize a compact and lightweight reciprocating compressor. Also, a drive stroke of the rotor may be adjusted to adjust a drive stroke of the piston connected to the rotor. The rotor may increase in drive stroke when the piston decreases in drive stroke.

According to embodiments disclosed herein, the motor may be miniaturized, improved in efficiency, lightweight, and have reduced noise. Further, various effects may be obtained that may be understood by the respective constitutions shown in embodiments.

Embodiments disclosed herein provide a reciprocating motor in which a drive stroke of a rotor is variously adjustable. Embodiments disclosed herein also provide a reciprocating motor capable of increasing in drive stroke when a drive stroke of a rotor decreases.

Embodiments disclosed herein further provide a reciprocating motor in which all resonant frequencies within a drive frequency are capable of being utilized. Embodiments furthermore provide a reciprocating motor capable of being minimized in size in an axial direction.

Embodiments disclosed herein provide a reciprocating motor in which a rotor is reduced in weight to reduce power consumption and thereby to improve motor efficiency. Embodiments disclosed herein provide a reciprocating motor that increases in only size of a magnet while maintaining a size of a rotor to improve a motor output.

Embodiments disclosed herein also provide a reciprocating motor in which a rotor decreases in length to minimally maintain a magnetic gap due to a tolerance. Embodiments additionally provide a reciprocating motor capable of maximizing motor spring rigidity due to a reduced magnetic gap.

Embodiments disclosed herein provide a reciprocating motor in which a stator and a rotor are easily manufactured to reduce manufacturing costs. Embodiments also provide a reciprocating motor in which blocks constituting a stator or a rotor come into surface contact with each other and are stacked in an axial direction, and thus, the blocks may be easily stacked when stacked in a radial direction, and the stacked state may be easily maintained.

Embodiments disclosed herein provide a reciprocating motor that is improved in workability because a magnet coil is wound around a bobbin, and then, an outer stator is inserted to be coupled to a hollow of the bobbin. Embodiments disclosed herein also provide a compact and lightweight reciprocating motor by reducing a size thereof.

Embodiments further provide a reciprocating motor in which a drive stroke of a rotor is adjusted to adjust a drive stroke of a piston connected to the rotor. Embodiments also provide a reciprocating motor capable of increasing in drive stroke when a drive stroke of a piston decreases.

Embodiments disclosed herein provide a transverse flux type reciprocating motor that may include a first reciprocating module including a first stator and a first rotor that reciprocates with respect to the first stator; a second reciprocating module including a second stator disposed to be spaced apart from the first stator in parallel to an axial direction and a second rotor that reciprocates with respect to the second rotor in the axial direction; and a connection member that connects side surfaces, which face each other, of the first rotor and the second rotors to each other. Thus, the connection member may be adjusted in length to adjust a distance between the first rotor and the second rotor, and also, centers of the first and second stators and centers of the first and second rotors may be offset to adjust a drive stroke of the rotor.

The first stator may include a first inner stator and a first outer stator disposed with a first gap in a radial outward direction of the first inner stator. The second stator may include a second inner stator disposed to be spaced apart form the first inner stator in parallel to the axial direction and a second outer stator disposed with a second gap in a radial outward direction of the second inner stator. The first rotor may be disposed in the first gap, and the second rotor may be disposed in the second gap.

A magnet coil may be wound around the first stator and/or the second stator. Side surfaces, which face each other, of the first stator and the second stator may be connected to each other through a spacer. A first magnet and a second magnet may be attached to surfaces of the first stator and the second stator, which face the first rotor and the second rotor, respectively.

The first stator and/or second stator may include a yoke part or yoke providing a magnetic path and a teeth part or teeth that extends from an inner surface of the yoke part in a central direction. The magnet coil may be wound around the yoke part or the teeth part.

Embodiments disclosed herein also provide a reciprocating compressor that may include a case having an inner space; a reciprocating motor disposed in the inner space of the case to allow a rotor to reciprocate; a piston coupled to the rotor of the reciprocating motor to reciprocate together with the rotor; a cylinder into which the piston is inserted to define a compression space; a suction valve that opens and closes a suction side of the compression space; and a discharge valve that opens and closes a discharge side of the compression space. The reciprocating motor may include the above-described transverse flux type reciprocating motor. Thus, the connection member may be adjusted in length to adjust a distance between the first rotor and the second rotor, and also, centers of the first and second stators and centers of the first and second rotors may be offset to adjust a drive stroke of each of the rotor and the piston connected to the connected to the rotor.

The reciprocating compressor may further include a joint member that connects the piston to the rotor of the reciprocating motor. When the connection member that connects the first and second rotors to each other increases in length by a distance α, the joint member may decrease in length by the distance α. Thus, the distance by which the second rotor is offset toward a bottom dead center (BDC) may be compensated, and the piston connected to the second rotor may be offset toward a top dead center (TDC) together with the first rotor to allow each of the rotor and the piton to increase in drive stroke.

The details of more embodiments are set forth in the accompanying drawings and the description. Other features will be apparent from the description and drawings, and from the claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parks and/or arrangements, alternative uses will also be apparent to those skilled in the art.

What is claimed is:

1. A reciprocating compressor, comprising:
a case having an inner space;
a reciprocating motor disposed in the inner space of the case to allow a rotor to reciprocate;
a piston coupled to the rotor of the reciprocating motor to reciprocate together with the rotor;
a joint that connects the piston to the rotor of the reciprocating motor;

a cylinder into which the piston is inserted to define a compression space;

a suction valve that opens and closes a suction side of the compression space; and a discharge valve that opens and closes a discharge side of the compression space, wherein the reciprocating motor comprises a transverse flux type reciprocating motor comprising:

a first reciprocating module comprising a first stator and a first rotor that reciprocates with respect to the first stator;

a second reciprocating module comprising a second stator spaced apart from the first stator in parallel to an axial direction and a second rotor that reciprocates with respect to the second stator in the axial direction; and a connection member that connects side surfaces, which face each other, of the first rotor and the second rotor to each other, wherein the connection member is adjustable in length in the axial direction, and when the connection member is increased in length by a distance α, the joint is decreased in length by the distance α.

2. The reciprocating compressor according to claim 1, wherein a first magnet and a second magnet are attached to surfaces of the first stator and the second stator, the surfaces facing the first rotor and the second rotor, respectively.

3. The reciprocating compressor according to claim 1, wherein the connection member is detachably fixed to at least one of the first rotor or the second rotor.

4. The reciprocating compressor according to claim 1, wherein the first stator comprises a first inner stator and a first outer stator disposed with a first gap therebetween in a radially outward direction of the first inner stator, and the second stator comprises a second inner stator spaced apart from the first inner stator in parallel to the axial direction and a second outer stator disposed with a second gap therebetween in a radially outward direction of the second inner stator.

5. The reciprocating compressor according to claim 4, wherein the first rotor is disposed in the first gap, and the second rotor is disposed in the second gap.

6. The reciprocating compressor according to claim 1, wherein a magnet coil is wound around at least one of the first stator or the second stator.

7. The reciprocating compressor according to claim 1, wherein side surfaces, which face each other, of the first stator and the second stator are connected to each other by a spacer.

8. The reciprocating compressor according to claim 1, wherein each of the first rotor and the second rotor is made of a magnetic material.

9. The reciprocating compressor according to claim 1, wherein at least one of the first stator or second stator comprises a yoke providing a magnetic path and teeth that extend from an inner surface of the yoke in a central direction, and wherein a magnet coil is wound around the yoke or the teeth.

10. The reciprocating compressor according to claim 1, wherein at least one of the first and second stators or the first and second rotors has a cross-section in the axial direction, at least a portion of which has an arc shape.

* * * * *